United States Patent [19]
DiIanni

[11] 3,914,920
[45] Oct. 28, 1975

[54] DECAPPING DEVICE FOR THE DECAPPING OF BOTTLES

[75] Inventor: Daniel DiIanni, Toronto, Canada
[73] Assignee: Carling O'Keefe Limited, Toronto, Canada
[22] Filed: Dec. 27, 1974
[21] Appl. No.: 536,819

Related U.S. Application Data
[62] Division of Ser. No. 467,013, May 6, 1974, Pat. No. 3,870,175.

[52] U.S. Cl. .............................................. 53/381 A
[51] Int. Cl.² ......................................... B65B 43/40
[58] Field of Search ................................. 53/381 A

[56] References Cited
UNITED STATES PATENTS
3,587,208   6/1971   Berry et al. ...................... 53/381 A
3,805,490   4/1974   Blecher ............................ 53/381 A

*Primary Examiner*—Travis S. McGehee
*Attorney, Agent, or Firm*—Sim & McBurney

[57] ABSTRACT

A bottle decapping device for the removal of crown caps from necked bottles is provided. The device includes a cylindrical body surrounding a fixed rod having a decapping element at its lower end. The body has a skirt which is engaged by the bottles for displacement against a compression spring for entry of the crown cap into the decapping element. The cap is removed by the action of the spring against the bottle.

6 Claims, 8 Drawing Figures

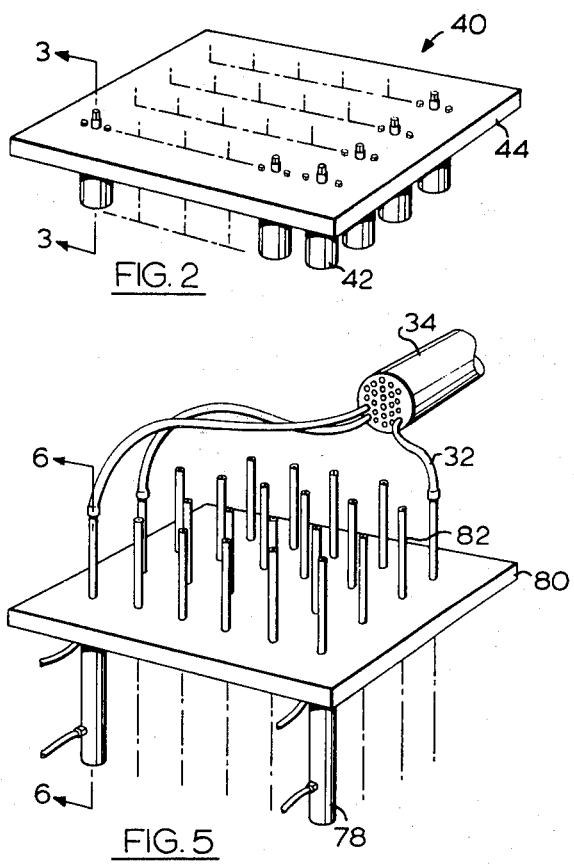

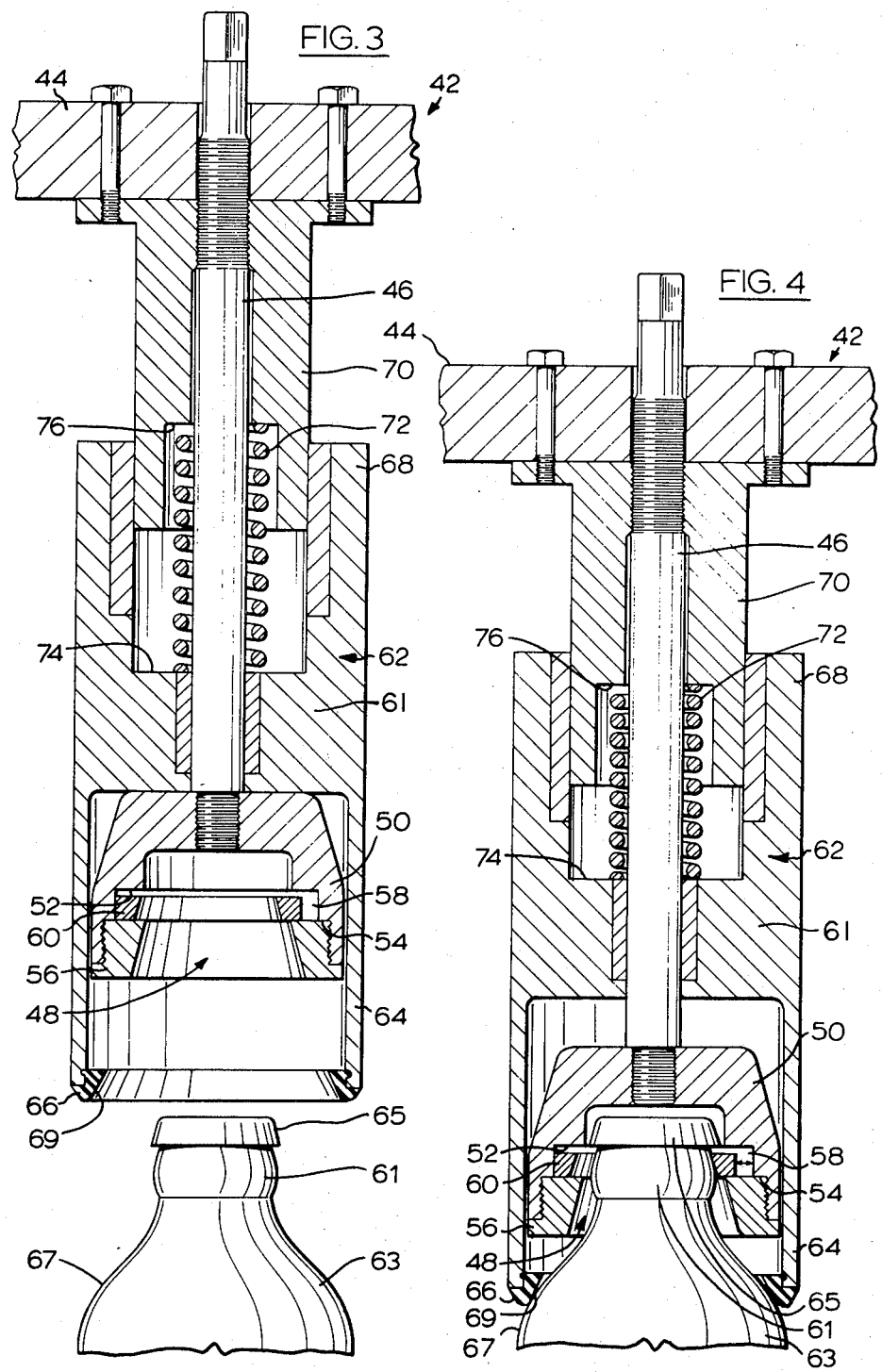

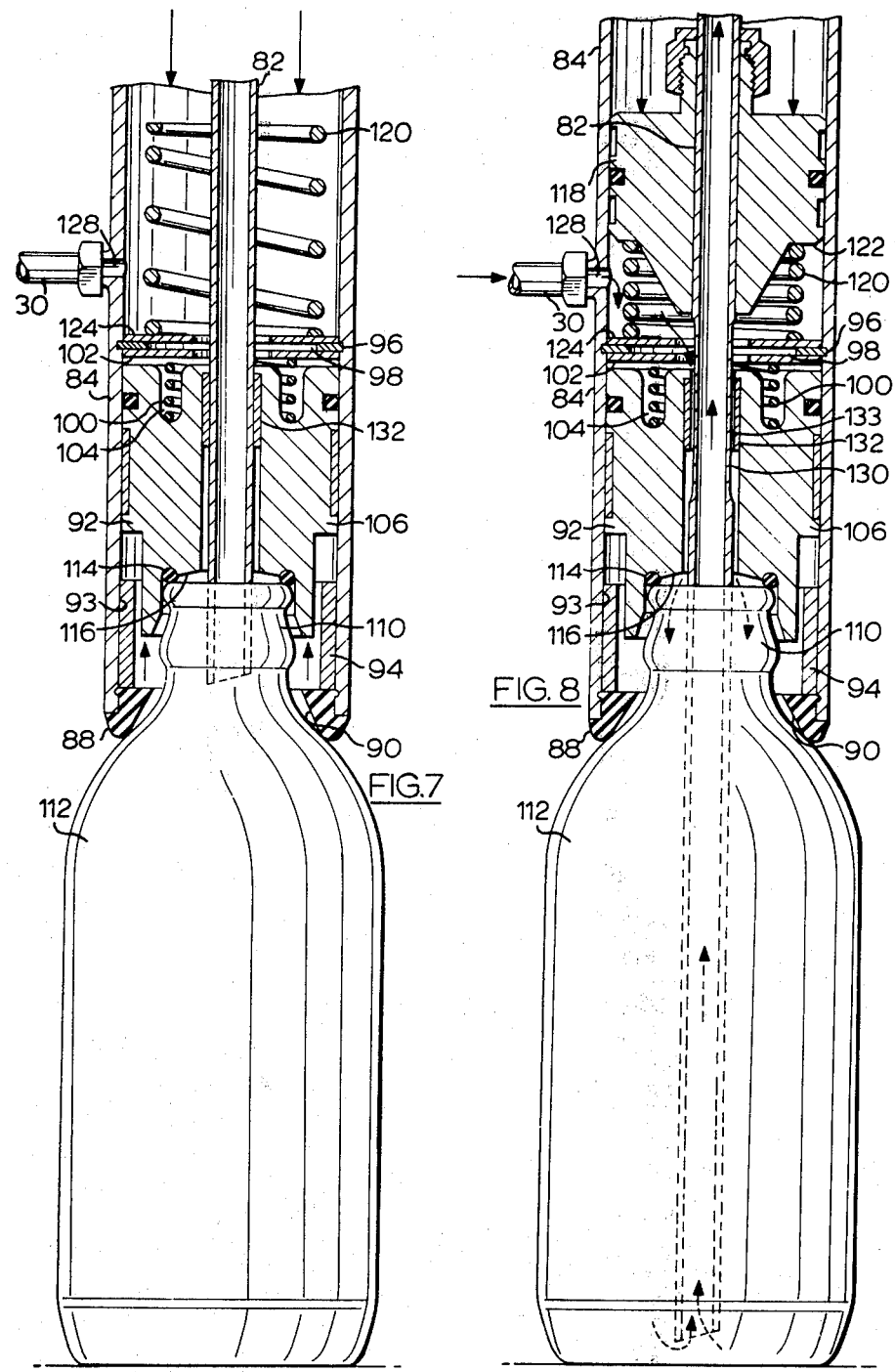

DECAPPING DEVICE FOR THE DECAPPING OF BOTTLES

CROSS REFERENCE TO RELATED APPLICATION

This application is a division of application Ser. No. 467,013 filed May 6, 1974.

FIELD OF INVENTION

The present invention is directed to the decapping of beer bottles for the subsequent decanting of beer from the bottles.

BACKGROUND TO THE INVENTION

In Canada, beer is sold mainly in bottled form, usually in cases containing 6, 12 or 24 bottles. In addition to brand markings on the case, each individual bottle also has a brand-identifying label thereon. The bottles are labelled in the beer bottling plant when the bottles are full of beer and the bottles have been capped. The labelled bottles then are packed in the cases for shipping to the retail outlet.

While the labelling procedure generally is efficient in providing uniformly-applied labels, sometimes errors occur and some bottles are mislabelled. Such mislabelled bottles as far as possible are rejected from those packed in cases due to their non-uniform appearance.

The rejected bottles contain beer which then is wasted. However, in Canada, excise tax is levied on beer as soon as it is brewed and in order to obtain a refund for unsold beer, such as that arising through mislabelling, the collection of beer from rejected bottles for recycling is an important economic consideration.

Traditionally, the beer has been collected from the rejected bottles by manual procedures, in which the cap first is removed from a bottle and then the beer is decanted into a collecting vat. Not only is this procedure time-consuming, in that one person can only decap one bottle at a time, but also results in the production of considerable quantities of foam in the collecting vat, arising from the pouring of the beer from a height into liquid in the vat. The foam gives rise to handling problems and difficulties in determining, in other than very rough manner, the quantity of beer which has been collected in the vat. Further, the beer is unnecessarily exposed to air in the decanting procedure, resulting in possible spoilage of the beer rendering it unsuitable for recycling.

SUMMARY OF INVENTION

The present invention provides a decapping device for use in an efficient mechanical system for simultaneous decapping multiple numbers of beer bottles followed by simultaneous decanting of beer from the opened bottles while the bottles are maintained in their usual packaging environment, typically a tray or case. Production of large quantities of foam and unnecessary exposure of the beer to air is avoided.

BRIEF DESCRIPTION OF DRAWINGS

FIG. 2 is a schematic perspective view of the decapping unit used in the procedure of FIG. 1;

FIG. 3 is a sectional view taken on line 3—3 of FIG. 2 of one decapping device in accordance with one embodiment of the invention and used in the decapping unit of FIG. 2 in a first position;

FIG. 4 is the sectional view of FIG. 3 with the decapping device in a second position;

FIG. 5 is a perspective view of the decanting unit used in the embodiment of FIG. 1;

FIG. 7 is the sectional view of FIG. 6 with the decanting device in a second position; and FIG. 8 is the sectional view of FIG. 6 with the decanting device in a third position.

DESCRIPTION OF PREFERRED EMBODIMENTS

Figure 1:
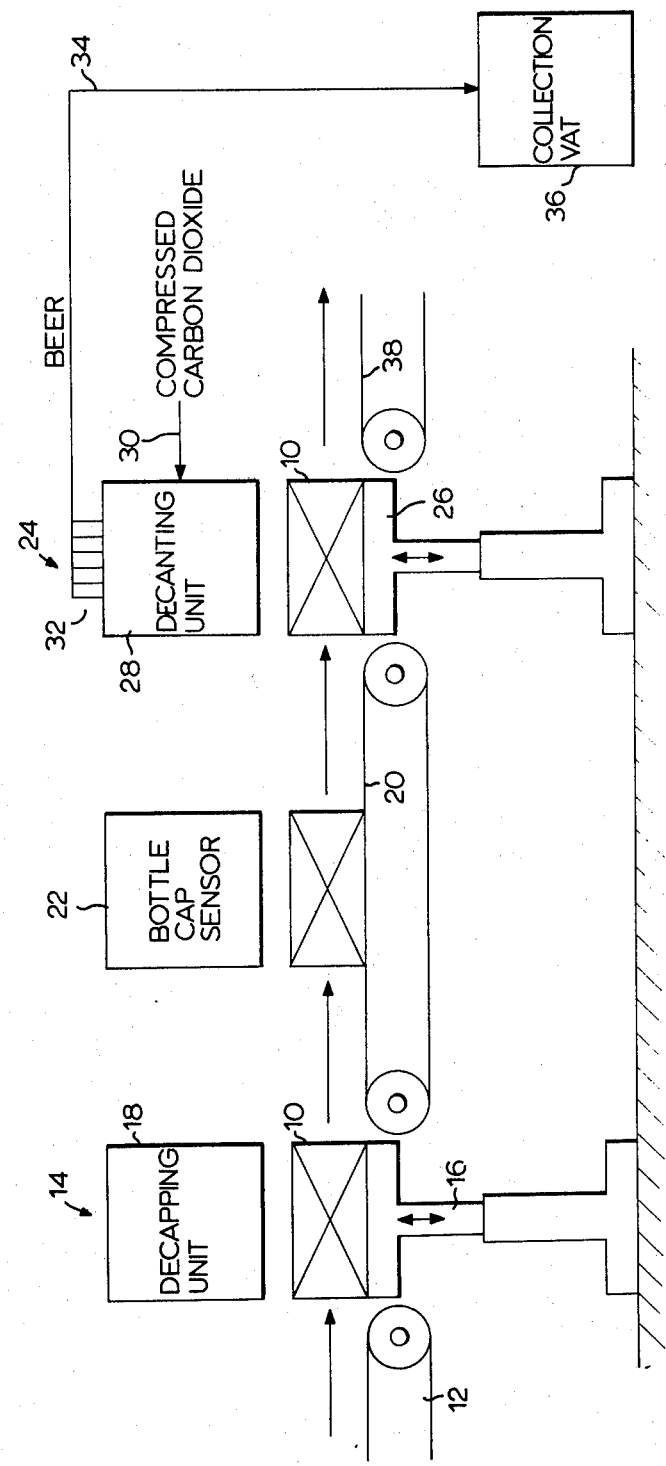
FIG. 1 is a schematic representation of the decapping and decanting procedure in accordance with the invention of parent application Serial No. 467,013.

Referring first to FIG. 1, there is shown in schematic form a decapping and decanting procedure for bottled beer. This procedure forms the subject of the above-mentioned application Serial No. 467,013 out of which the present application is divided. A beer case 10 is conveyed by any convenient conveyor system 12 to a decapping station 14 which includes an elevating platform 16, actuatable in any convenient manner, such as pneumatically or hydraulically, for reciprocating a beer case 10 positioned thereon in a vertical direction. The decapping station 14 also includes a decapping unit 18, described in more detail below with reference to FIGS. 2 to 4, which is positioned in a substantially fixed location vertically above the elevating platform 16.

A case 10 of beer bottles positioned on the elevating platform 16 is elevated to engage the decapping unit 18 to remove simultaneously the caps from the bottles in the case 10. The procedure may be adapted to operate with 6, 12 or 24 bottle cases, as desired. The elevating platform 16 returns to its original position and the case 10 in which the bottles are now decapped is passed to a conveyor 20 of any convenient form which conveys the case 10 past a bottle cap sensor 22 to a decanting station 24. The bottle cap sensor 22 may be of any suitable construction to ensure that all the caps have been removed from the beer bottles prior to passage of the case 10 to the decanting station 24. The sensor 22 may be omitted, if desired.

The decanting station 24 includes an elevating platform 26, actuatable in any convenient manner, such as pneumatically or hydraulically, for reciprocating the beer case 10 positioned thereon in a vertical direction. The decanting station 24 also includes a decanting unit 28, described in more detail below with reference to FIGS. 5 to 8. The decanting unit 28 is positioned in a substantially fixed location vertically above the elevating platform 26.

A case 10 of decapped beer bottles positioned on the elevating platform 26 is elevated to a position in which the decanting unit operatively engages the bottles. Compressed carbon dioxide, or any other suitable inert fluid, from a suitable source thereof, is fed by line 30 to the decanting unit 28 to force beer out of all the bottles in the case 10 simultaneously, the displaced beer passing out of the decanting unit 28 by lines 32 which are joined to a common beer drain line 34. The beer passes by the drain line 34 to a collection vat 36.

Following displacement or decanting of the beer from the bottles, the platform 26 returns to its original position and the case 10, now containing empty beer bottles, is discharged to a conveyor belt 38 of any convenient construction. The case of empty bottles is conveyed by the belt 38 to any desired location.

The decapping and decanting procedure rapidly and effectively decaps a plurality of bottles simultaneously and decants the beer from the decapped bottles simultaneously into a collection vat in a manner whereby production of foam may be minimized. The procedure of this invention, therefore, represents a considerable improvement over the manual prior art procedures.

Turning now to consideration of FIGS. 2 to 4, wherein there is shown in more detail a decapping unit in accordance with the present invention and utilizable at the decapping station 14 of FIG. 1, a decapping unit 40 includes a plurality of decapping elements 42, corresponding in number to the maximum number of bottles which is holdable in the beer case 10, typically 24 as illustrated, so that each decapping element 42 removes a top from one bottle in the case 10. The decapping elements 42 are mounted on a mounting plate 44 of any convenient construction and the mounting plate 44 is held in a fixed location in any convenient manner.

Each decapping element 42 includes a central rod member 46 mounted in a substantially fixed position and which has a decapping member 48 mounted on the lower end thereof. The decapping member 48 includes a cup element 50 having annular shoulders 52 and 54 formed in the inner wall thereof. An annular ring member 56 is fixedly mounted in the mouth of the cup element 50 in engagement with the shoulder 54. The fixed ring member 56 defines with the shoulder 52 an annular cavity 58. In the annular cavity 58 is situated a movable ring member 60 of outer diameter less than the outer diameter of the cavity 58 but greater than the inside diameter of the ring member 56. The movable ring member 60 is resiliently mounted for biasing towards and into engagement with the side wall of the cavity 58.

The resiliently-displaceable ring member 60 includes a lip which is capable of engaging the underside of a crown cap to remove the same during operation of the decapping element 42.

The fixed ring member 56 has an inside diameter which is large enough to enable the neck 61 of a beer bottle 63 to pass therethrough. The resiliently-displaceable ring member 60 normally is biased to a position in which a portion of its periphery is located in the orifice of the fixed ring member 56, as illustrated in FIG. 3. The resiliently-displaceable ring member 60 has an inside diameter allowing the crown top 65 and adjacent area of the neck 61 of the beer bottle 63 to pass therethrough.

An outer cylindrical member 62 is coaxially mounted in sliding relation on the rod 46 adjacent the decapping member 48. The sleeve 62 includes a disc-like portion 61 slidably engaging the rod 46 and an integral downwardly-extending skirt portion 64 which surrounds and encloses the decapping member 48. The mouth of the skirt portion 64 has a diameter substantially that of the shoulder 67 of the bottle 61 and includes an annular ring 66 of any suitable material having an inclined beer bottle shoulder-engaging surface 69.

The outer cylindrical sleeve 62 also includes an upwardly-extending skirt portion 68 which is situated in sliding telescoping relation with a cylindrical element 70 joined to the mounting plate 44 coaxially of the rod 46. A compression spring 72 is situated between opposed surfaces 74 and 76 of the cylindrical elements 62 and 70 respectively and normally biases the cylindrical element 62 downwardly away from the plate 44. The lower extremity of movement of the cylindrical element 62 is defined by the fixed location of the decapping member 48 and the upper extremity by the position of abutment of the surfaces 74 and 77 of the elements 62 and 70 respectively.

The decapping element 42 operates by insertion of the neck 61 of a beer bottle 63 substantially centrally in the mouth of the skirt portion 64. As the bottle 63 rises, under the influence of the elevating platform 16, the shoulder engaging surface 69 engages the shoulder 67 of the beer bottle. As the bottle 63 continues to rise, this engagement causes the sleeve 62 to move upwardly against the action of the spring 72 and the crown cap 65 enters the orifice of the fixed ring member 56 and engages the projecting portion of the resiliently-displaceable ring member 60. Continued upward movement of the bottle 63 causes the crown cap 65 to displace laterally the ring member 60 until the cap 65 has passed upwardly beyond the ring member 60 allowing the ring member to engage the area of the neck 61 of the bottle 63 immediately below the crown cap 65. When this position is reached, surfaces 74 and 77 are in engagement and the upper extremity of movement is reached. This position is illustrated in FIG. 4.

Upon retraction of the elevating platform 16, the action of the spring 72 against the bottle 63 through the ring 66 causes the bottle 63 to move downwardly resulting in engagement of the lip of the resiliently-displaceable ring member under the crown cap 65 and lifting off of the cap as the bottle 63 moves further downwardly.

The action of the decapping element 42 occurs simultaneously with the other decapping elements 42 of the decapping unit 18.

The decanting unit 28 is shown typically in FIGS. 5 to 8 and includes a plurality of decanting members 78 mounted in any convenient manner on a mounting plate 80. A reciprocable rigid tube 82 is associated with each decanting member 78. Flexible tubes or lines 32 join each rigid tube 82 to the beer drain line 34.

Figure 6:
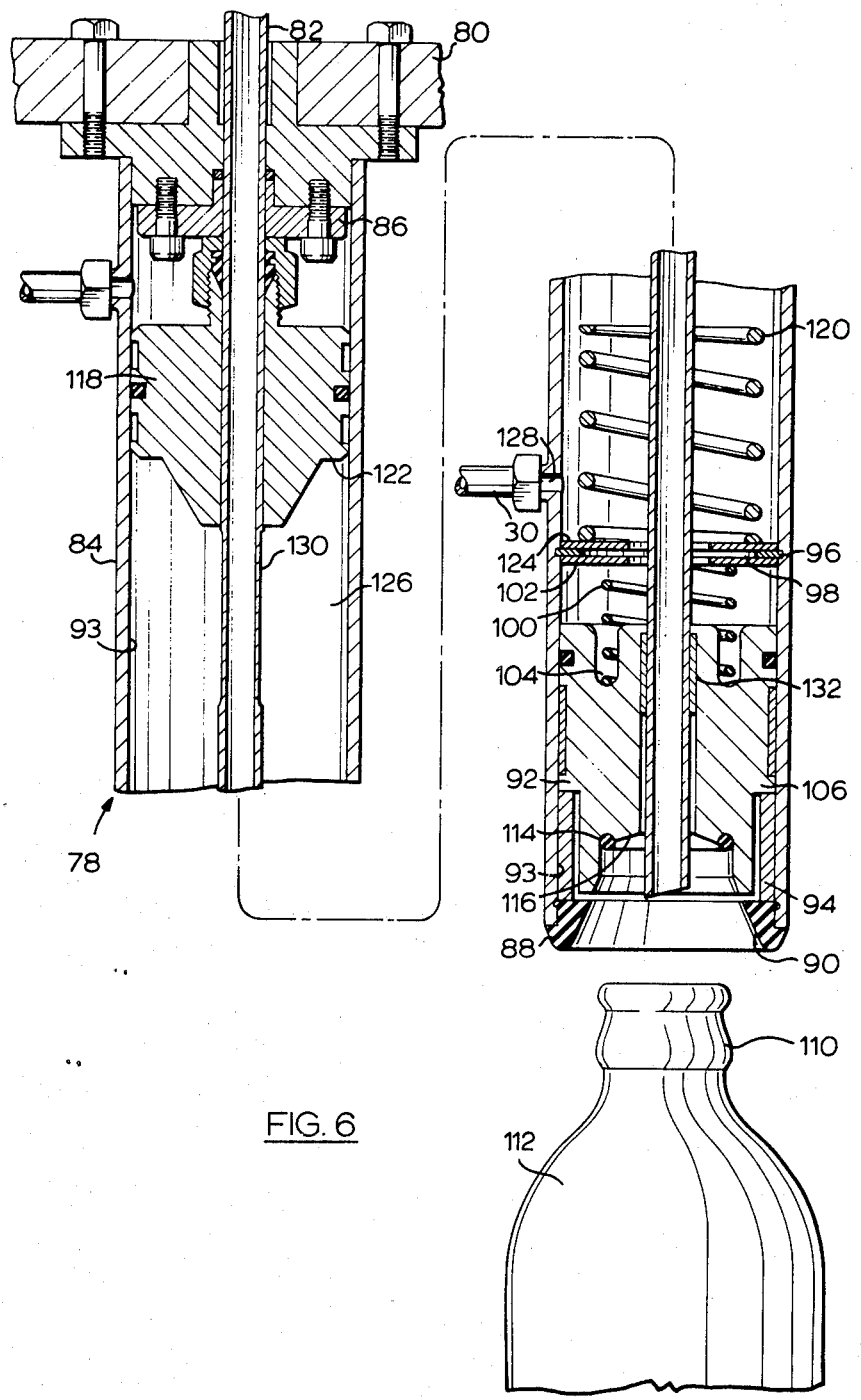
FIG. 6 is a sectional view, taken on line 6—6 of FIG. 5, of one decanting device in accordance with the invention of application Ser. No. 536,486 filed concurrently herewith, and also divided out of application Ser. No. 467,013, and used in the decanting unit of FIG. 5 in a first position.

As seen more clearly in FIGS. 6, 7 and 8, the decanting member 78, which forms the subject of concurrently-filed copending application Ser. No. 536,486 also divided out of application Ser. No. 467,013, includes an outer hollow cylindrical element 84 closed at its upper end by a circular closure element 86, the latter being mounted to the plate 80. The hollow cylindrical element 84 is open at its lower end and an annular ring 88 having an inclined beer bottle shoulder-engaging surface 90 is attached to the element 84.

The tube 82 extends axially of the cylindrical element 84 and is mounted for reciprocal sliding movement in the closure element 86 and a cylindrical plug element 92.

The cylindrical plug element 92 is located in sliding relation to the inner wall 93 of the hollow cylindrical element 84 adjacent the lower end thereof and normally positioned in engagement with a sleeve 94 fixedly mounted in the element 84.

A disc element 96 having a central opening 98 through which the tube 82 passes is fixedly mounted to the inner wall 93 of the hollow cylindrical element 84 and spaced axially from the normal position of the plug element 92. A compression spring 100, engaging opposed surfaces 102 and 104 of the disc element 96 and the plug element 92, normally biases these elements apart and normally maintains the plug element 92 in engagement with the sleeve 94.

The plug element 92 may move upwardly against the action of the spring 100 until it engages the surface 102 of the disc element 96, as seen in FIG. 7.

A cup-like element 106 is mounted to the lower end of the plug, element 92 in any convenient manner, for example, using the ball and socket arrangement illustrated. A skirt portion 108 of the cup-like element 106 has a diameter corresponding substantially to the diameter of the top 110 of the decapped bottle 112 from which beer is to be decanted.

A rubber sealing ring 114 is situated in the base 116 of the cup-like element 106 to provide a gas seal with the top 110 of the bottle 112 during use.

A further plug element 118 is fixedly mounted on the tube 82 and is situated in sliding relation to the inner wall 92 of the cylindrical element 84 for reciprocation with the tube 82. A compression spring 120 in engagement with opposed surfaces 122 and 124 of the plug element 118 and the disc element 96, respectively, normally biases the plug element 118 to its upper axial extremity of movement, namely, into engagement with the end closure 86, thereby defining the upper limit of movement of the tube 82.

The plug element 118 and the disc element 96 define a chamber 126 through which the plug element 118 may move against the action of the compression spring 120 to a position adjacent the disc element 96, as seen in FIG. 8, thereby defining the lower extremity of movement of the tube 82. Preferably, the chamber 126 is dimensioned so that the limits of movement of the tube 82 are in the manner illustrated, namely, an upper extremity where the tube 82 just projects through the cup member 106 and a lower extremity where the tube 82 extends into a beer bottle 112 to a location just above the bottom of the bottle.

An orifice 128 communicates with the chamber 126 and allows the introduction of compressed carbon dioxide, or other gas substantially inert to the beer from the source thereof (not shown) to the chamber 126 by line 30.

The tube 82 may be constructed of any suitable rigid material, such as stainless steel. The tube has a short portion of its length 130 extending axially downwardly from the lower extremity of the plug element which has a decreased outside diameter.

The length of the tube portion 130 should be sufficient at least to extend through a bearing ring 132 associated with the slidable plug element 92 and normally engaging the tube 82 to define a fluid flow passage 132 when the tube 82 has assumed the position shown in FIG. 8.

The decanting member 78 operates by first moving a beer bottle 112 upwardly substantially centrally into the orifice of the ring 88 under the action of the elevating platform 26 until the neck 110 of the bottle engages the sealing ring 114 in the cup member 106. Continued upward movement of the bottle 112 causes vertical movement of the plug 92 against the action of the spring 100 until the sloping surface 90 of the ring 88 engages the shoulder 113 of the bottle 112. The device has now assumed the position shown in FIG. 7.

The tube 82 now is lowered in any desired manner, for example, under the influence of compressed carbon dioxide, into the bottle 112 against the action of the spring 120 until the reduced outer-diameter portion 130 of the tube 82 establishes passageway 132 between chamber 126 and the interior of the bottle 112 and assumes the position shown in FIG. 8.

Compressed carbon dioxide is passed into the chamber 126 through opening 128 causing the beer to be displaced from the bottle through the tube 82 into the appropriate line 32. Once the bottle is empty, the compressed carbon dioxide feed is halted and the plug 118, and hence the tube 82 is allowed to retract under the influence of the spring 120 to the position shown in FIG. 7.

Thereafter, upon retraction of the elevating platform 26, the bottle 112 is removed and the plug 92 returns to the position shown in FIG. 6 under the influence of the spring 100. The operation of the decanting member 78 occurs simultaneously for all the members 78 of the decanting unit 28.

SUMMARY

The present invention, therefore, provides a bottle decapping device suitable for use in a beer bottle decapping and beer decanting apparatus which can handle any number of bottles simultaneously in their normal packaging structure, and additionally, avoids the formation of large and unmanageable quantities of foam and substantial exposure of the beer to air.

Modifications are possible within the scope of the invention.

What I claim is:

1. A bottle decapping device for removing crown caps from necked bottles comprising
    elongate rod means having a decapping element mounted at one end thereof,
    mounting means located adjacent the other end of said rod means for mounting said device in a substantially fixed position,
    a right cylindrical body member axially slidably mounted on said rod means, said cylindrical body member including a disc element having a central opening through which said rod passes in sliding relation thereto,
    said cylindrical body element including a first skirt element depending coaxially from one side of said disc element beyond the furthest extremity of said decapping element from said rod means and terminating in a circular opening, and
    compression spring means surrounding said rod means and situated between said mounting means and the other side of said disc element to bias normally said disc element into engagement with said decapping element,
    said cylindrical body member being movable against the bias of said spring means to a position remote from said normal position and out of engagement with said decapping element,
    said decapping element comprising a cup member extending towards the opening of said first skirt element and having a stepped inner wall defining first and second shoulders,
    a first ring member mounted in the orifice of said cup member in engagement with said first shoulder, the inner surface of said first ring member defining an annular recess with said second shoulder, said first ring member having an inside diameter at least the outer diameter of a bottle cap and neck, a second ring member mounted in the annular recess, said second ring member having an outer diameter less than the diameter of the recess and greater than the inside diameter of the first ring member, said second ring member having an inside diameter slightly greater than the diameter of the crown cap, and resilient means associated with said second ring member for biasing said second ring member normally into engagement with the wall of the recess so that part of the ring is located in the line of sight of the interior of the cup member, said second ring member being movable on the diameter thereof against said resilient means out of said engagement with the wall of the recess.

2. The decapping device of claim 1, wherein said second ring member has a sloped inner periphery.

3. The decapping device of claim 1, wherein said mounting means includes a second cylindrical element extending axially of the rod means, and said cylindrical body member includes a second skirt element extending axially from said other side of said disc element into telescoping relation with said second cylindrical element, said second skirt element and said second cylindrical element defining an enclosed chamber wherein said compression spring is located.

4. The decapping device of claim 3 wherein said second cylindrical element includes an engagement surface defining the limit of movement of said cylindrical body member against the resilience of said compression spring.

5. The decapping device of claim 4 wherein the mouth of said first skirt element has a bottle engaging ring mounted therein.

6. The decapping device of claim 5 wherein said first skirt element extends from said disc element to a position wherein upon insertion of a capped and necked bottle substantially centrally into the mouth of said first skirt element said bottle engaging ring engages a shoulder of the bottle and upon the axial application of force to said bottle, the cylindrical body member is biased against said compression spring and is moved axially of said rod while the cap is inserted into the mouth of said cup member until the cap displaces and moves beyond the second ring member, which then reverts to a cap removing position, the other side of said disc element engages said engagement surface of said second cylindrical element, and upon release of said axial force, said spring acts on the shoulder of the bottle causing axially outward movement of the bottles and removal of the bottle cap by the second ring member while the cylindrical body element reverts to its original position.

* * * * *